3,095,562
**COMPUTER FOR DATA CONVERSION
AND STABILIZATION**
Lawrence H. Dworetzky, Valhalla, and John W. Gray, Pleasantville, N.Y., assignors to General Precision, Inc., a corporation of Delaware
Filed Mar. 8, 1960, Ser. No. 13,647
9 Claims. (Cl. 343—8)

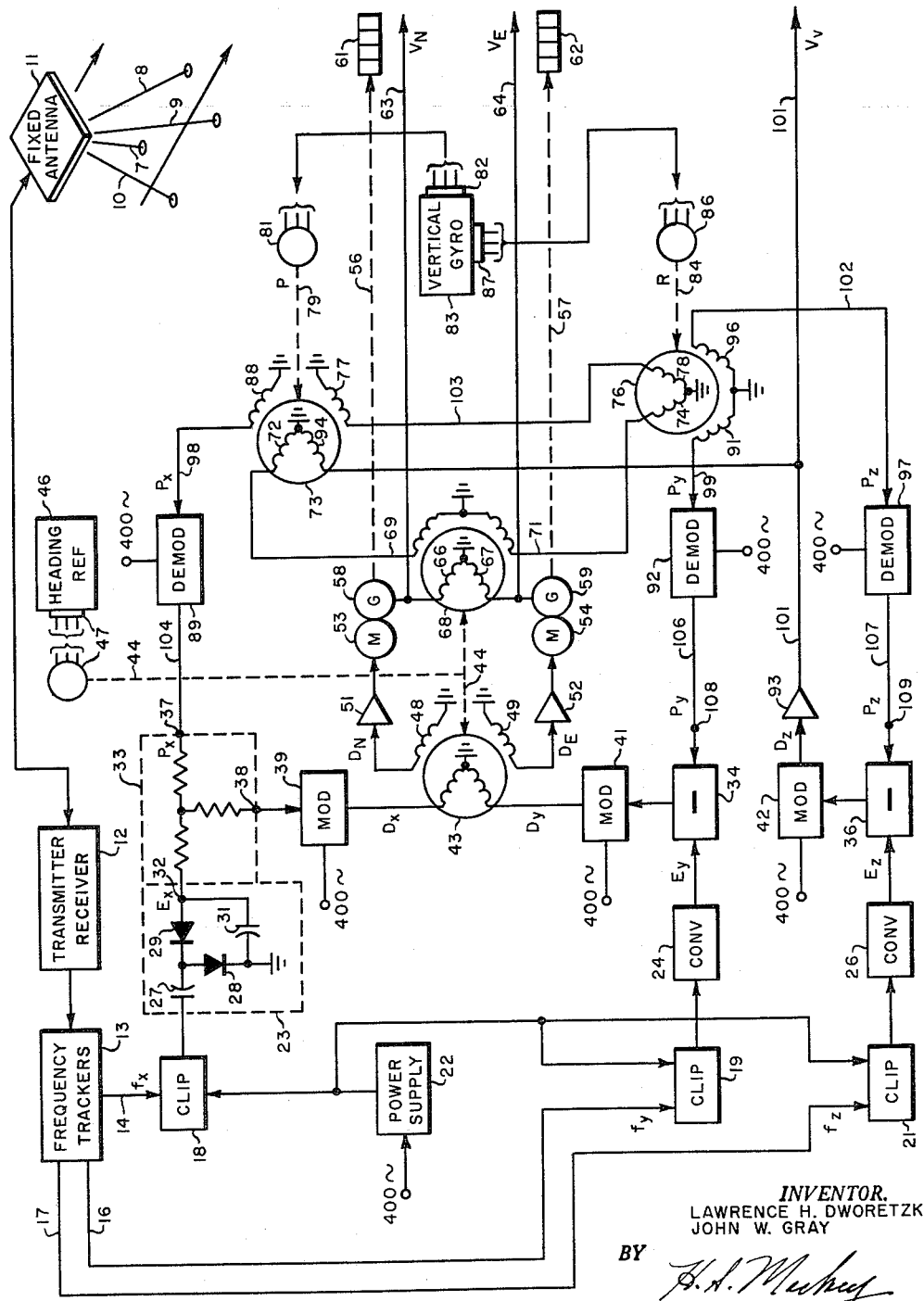

This invention relates to aircraft Doppler radar navigation instruments and particularly to computers therefor which convert the output data to useful form.

When the microwave antenna of an aircraft Doppler radar instrument is fixed to the airframe, two transformations of data are generally required; the output data in airframe coordinates must be converted to data in north-south, east-west, and vertical coordinates, and the data must be corrected for errors introduced by the pitching and rolling of the aircraft.

These data transformations are made simultaneously by the means of this invention. Three signals are received from the radar receiver. These signals represent, by their frequencies, aircraft velocities in the airframe $xyz$ coordinate system. In this system the $x$-axis is in the direction of the aircraft fore-aft centerline, the $y$-axis is in the airframe transverse direction and the $z$-axis is perpendicular to the other two. These three input signals are clipped and limited, then are transformed into three signals the current magnitudes of which represent these three velocities. These signals are applied to a coordinate transformer to transform them to signals in terms of earth coordinates. The signals are also applied to a set of resolvers which introduce pitch angle and roll angle corrections. The signals are additionally applied to several feedback loops which, by actions similar to rate servomechanisms, generate voltages representing aircraft velocities in the earth-referenced directions.

An integrator is provided to secure two additional signals representing at any instant elapsed distances in the north and east directions.

The three actions above described, including coordinate transformation, pitch and roll correction and rate servo action, do not take place consecutively in the order in which they are described, but actually occur simultaneously within a coordinated set of three interconnected feedback loops.

One purpose of this invention is to provide an instrument for electrical coordinate transformation in three dimensions.

Another purpose of this invention is to provide an aircraft instrument for use with a fixed-antenna radar which eliminates errors due to aircraft pitch and roll.

A still further purpose of this invention is to effect the above purposes simultaneously with improved economy and precision.

A further understanding of this invention may be secured from the detailed description taken together with the accompanying drawing, the single FIGURE of which is a schematic diagram of one embodiment of the invention.

Referring now to the drawing, an airborne microwave Doppler radar instrument includes a microwave antenna 11 immovably fixed to the airframe so that the fore-and-aft axis and transverse axis of the antenna are respectively parallel to the centerline and transverse axis of the airframe. The antenna consists of a combination of linear arrays. The linear arrays emit four concentrated beams of microwave energy toward the earth, as indicated by the lines 7, 8, 9, and 10, with the four target areas aligned in pairs generally parallel to the ground track and perpendicular thereto. These pairs of beams are so emitted and received that the Doppler sum frequency of longitudinal pairs represents ground track speed and the Doppler sum of transverse pair frequencies provides drift angle information. The Doppler difference frequency of a pair provides vertical velocity information.

Such an antenna and its operation are described in U.S. Patent No. 2,915,748, of W. J. Tull et al.

The antenna 11 is actuated by a transmitter-receiver 12 which also receives, from the antenna, the microwave beam echoes containing Doppler information. This Doppler information is tracked and measured by three similar frequency trackers operating on the three Doppler spectra representing $x$, $y$ and $z$ velocities. These three trackers are generally indicated by the rectangle 13. It will be understood that each of the demodulated Doppler microwave signals has a broad, noiselike frequency spectrum with a relatively indistinct maximum amplitude frequency. This spectrum is continuously changing in its detailed outline and also shifting in frequency position due to changes in aircraft speed. It is therefore necessary to employ the special techniques of the frequency tracker component to measure the central spectrum frequency with high accuracy, to lock to that central frequency, to track the frequency as it changes, and to emit a sinusoidal, single frequency signal representing the central frequency of the spectrum.

A suitable frequency tracker consists of a modulator receiving the demodulated Doppler spectrum signal and an adjustable oscillator. The oscillator output is connected to heterodyne the Doppler signal and the output containing the difference frequency is applied through a narrow fixed filter to a demodulator, where an error signal is derived. This error signal is integrated and applied to control the oscillator so that its output frequency represents the Doppler spectrum central frequency and constitutes the frequency tracker output signal.

Such a frequency tracker is described in U.S. Patent No. 2,915,748, supra.

The three signals respectively emitted by the three frequency trackers are applied to conductors 14, 16 and 17. These signals consist of sinusoidal alternating currents having frequencies $f_x$, $f_y$, and $f_z$ which represent aircraft velocities in the $x$, $y$ and $z$ directions, respectively. These signals are applied to three clipping circuits 18, 19 and 21 which, by clipping and amplifying, transform the signals into rectangular waveform signals of nominally precise peak-to-peak values.

The direct-current supply 22 which energizes the clipping circuits is unregulated and does not eliminate change of output voltage with change of the 400 c.p.s. input voltage, and in fact preferably has an output potential strictly proportional to the input potential. This is desirable to neutralize errors caused at other 400 c.p.s. inputs by power voltage variations. Thus the peak-to-peak values of the clipping circuit outputs are strictly proportional to the 400 c.p.s. line voltage.

The clipping circuit outputs are applied to frequency-conversion devices 23, 24 and 26 which emit signals having potential amplitudes proportional to the frequencies of their input signals. These converter circuits being identical, only circuit 23 is shown in detail.

In the operation of frequency converter 23, the time constant of capacitor 27 is made shorter than one-half period of the applied signal. When the signal is positive, it charges the capacitor 27 to the crest value through diode 28. During the negative half cycle of the input signal, the capacitor 27 is charged through diode 29 and large capacitor 31, so that in the absence of current drain the junction 32 is maintained at a below-ground value equal to the peak-to-peak input potential. In the presence of the load current drain it may be shown that the output potential at junction 32 is proportional to the input frequency.

A frequency-to-potential conversion circuit of this type is described in more detail in U.S. Patent No. 2,584,866.

The frequency-conversion circuit outputs are applied to identical subtracting circuits 33, 34 and 36, which may consist of three-resistor networks as shown in detail for circuit 33. In this circuit direct potentials applied at terminals 32 and 37 are subtracted by the network and the difference potential appears at terminal 38. The direct potential difference outputs are transformed into corresponding 400 c.p.s. alternating current signals by the modulators 39, 41 and 42. These difference signals are denoted by the terms $D_x$, $D_y$ and $D_z$.

Two of these signals, $D_x$ and $D_y$, are applied to the two rotor windings of a four-winding resolver, 43. The rotor is positioned to the aircraft heading angle, H, by a shaft 44 actuated from a heading reference element 46. Electrical data transmission may be employed between the heading reference element 46 and the shaft 44 as indicated by the 3-wire data transmission system 47. As is well understood, the two output windings of such a resolver, such as windings 48 and 49, emit signal potentials $D_N$ and $D_E$ which in terms of the input signals, $D_x$ and $D_y$, and the rotor angle, H, are expressed by the equations:

$$D_N = D_x \sin H + D_y \cos H \quad (1)$$
$$D_E = D_x \cos H - D_y \sin H \quad (2)$$

Thus the difference or error signals, $D_x$ and $D_y$, in the aircraft coordinate system are transformed by the resolver into equivalent error signals in the north-east coordinate system. As might be expected, the form of these equations is exactly that of the general equations for transforming any coordinates from one axial system to a second axial system in the same plane having a coincident origin.

The stator windings, 48 and 49, are connected through amplifiers 51 and 52 to motors 53 and 54. The motor shafts, 56 and 57, drive tachometer generators 58 and 59. The shafts 56 and 57 are also connected to two revolution counters 61 and 62. The shafts 56 and 57 turn at rates which are proportional to the magnitudes of the signals applied to the motors. The generator potential outputs at conductors 63 and 64 are also proportional to these shaft rates and to the input signal magnitudes. The revolution counters 61 and 62 indicate elapsed revolutions of the shafts 56 and 57, which are equal to the integrals of the shaft rates and of the tachometer output potentials.

The generator output conductors 63 and 64 are connected to the rotor windings 66 and 67 of a second, four-winding resolver 68 which, like resolver 43, is rotated in accordance with the heading angle H by the shaft 44. The operation of this resolver 68 is represented by equations similar to Equations 1 and 2 and this resolver, like resolvers 43, transforms signals representing coordinates in one system to coordinates in another, coplanar system having the same origin. In this case, however, the transformation is from the north-east coordinate system back to the aircraft $x$—$y$ system, the reverse of the earlier operation. The output conductors 69 and 71 of resolver 68 are in turn connected to two other four-winding resolver rotors. Conductor 69 is connected to the rotor winding 72 of resolver 73 and conductor 71 is connected to the rotor winding 74 of resolver 76. One output winding 77 of resolver 73 is connected to the other input winding 78 of resolver 76. The resolver 73 rotor is rotated to an angle P representing the aircraft pitch angle. This is accomplished by connecting the resolver shaft, 79, through a three wire data transmission repeater 81, to a data transmitter 82 positioned on a pitch gimbal bearing of a vertical gyro 83. The resolver 76 is similarly positioned to the roll angle R by connecting its shaft 84 through a data repeater 86 to a transmitter 87 positioned on a roll gimbal bearing of the vertical gyro 83.

The stator output winding 88 of resolver 73 is connected to a demodulator 89 referenced to the 400 c.p.s. supply, where the signal appearing in winding 88 is converted from alternating to direct current. This direct current signal is applied to the feedback terminal 37 of the subtracting circuit 33. Similarly, the stator output winding 91 of resolver 76 is connected through demodulator 92 to the feedback terminal of the subtracting circuit 34.

The output $D_z$ of modulator 42 is amplified in amplifier 93 and applied to winding 94 of resolver 73. The output signal from stator winding 96 of resolver 76 is applied through demodulator 97 to the feedback terminal of subtracting circuit 36.

In the operation of this circuit, the potential, $E_x$, applied to the terminal 32 has a magnitude, as stated, representing the frequency $f_x$ and the velocity of the aircraft in the $x$ direction. Similarly, potentials $E_y$ and $E_z$ are applied to the subtracting circuits 34 and 36 and have similar significance.

The difference signals, $D_x$ and $D_y$, are applied to the resolver 43, as stated. This resolver transforms these signals from the $x$—$y$ coordinate system to the north-south and east-west coordinate system, so that the signal applied to the motor 53 is the north-south difference signal, termed $D_N$, and that applied to motor 54 is the east-west difference signal, termed $D_E$.

The resolver 68 performs the same function in reverse, transforming the rotor inputs in the $N/E$ coordinate system to stator outputs in the $x/y$ coordinate system.

Let the output in conductor 69 be termed $V_x$ and that in conductor 71 be termed $V_y$. Also let the signal in conductor 98 applied to demulator 89 be a potential $P_x$ and that in conductor 99 applied to demodulator 92 be a potential $P_y$. It is desired to correct the potential $V_x$ for pitch and roll angle errors to form the potential $P_x$ and it is desired to correct the potential $V_y$ for pitch and roll angle errors to form the potential $P_y$.

Also let the output of high-gain amplifier 93 in conductor 101 be termed $V_v$ and the signal in conductor 102 applied to demodulator 97 be termed $P_z$.

The operation of the pitch and roll resolvers 73 and 76 is described by equations exactly the same in form as those for resolver 43, Equations 1 and 2, and for resolver 68. These equations are generalized:

$$P_a = e_1 \sin \theta + e_2 \cos \theta \quad (3)$$
$$P_b = e_1 \cos \theta - e_2 \sin \theta \quad (4)$$

in which $P_a$ and $P_b$ are the two stator output potential signals, $e_1$ and $e_2$ are the two rotor input potentials, and $\theta$ is the rotor angle. Since the resolvers 73 and 76 are interconnected, there are only three outputs which, in the above simple form, are stated in terms of their inputs as follows:

$$P_x = V_x \cos P - V_v \sin P \quad (5)$$
$$P_y = (V_x \sin P + V_v \cos P) \sin R + V_y \cos R \quad (6)$$
$$P_z = (V_x \sin P + V_v \cos P) \cos R - V_y \sin R \quad (7)$$

The rectified signals representing $P_x$, $P_y$ and $P_z$ are applied through conductors 104, 106 and 107 to the subtracting circuit feedback terminals 37, 108 and 109.

The circuits generating the three signals $P_x$, $P_y$ and $P_z$ constitute three feedback loops of the rate or velocity type. Two of them are servomechanism loops containing motors. The third feedback loop generating $P_z$ contains no motor. The $P_x$ loop is traced through resolver 43, resolver 68, resolver 73, its winding 88, demodulator 89, subtracting circuit 33, and modulator 39. The $P_y$ loop is traced through resolvers 43, 68 and 76, resolver winding 91, demodulator 92, subtracting circuit 34, and modulator 41. The $P_z$ loop is traced through resolvers 73 and 76, resolver winding 96, demodulator 97, subtracting circuit 36, and modulator 42. In all three loops the respective amplifiers 51, 52 and 93 have high gains. The three respective outputs, $V_N$, $V_E$ and $V_v$ are positional, and proportional to the input signals, $f_x$, $f_y$, and $f_z$, but the feedbacks are nevertheless rate or velocity feedbacks and generate the feedback quantities $P_x$, $P_y$, and $P_z$.

Specifically, the operation of the $P_x$ rate servomechanism feedback loop is as follows. The signal $E_x$ is applied to the subtracting circuit 33. The difference signal $D_x$ generates the signal $D_n$ which becomes the input signal to amplifier 51. This high gain amplifier causes motor 53 to start. As the motor speed increases, it generates an increasing signal $P_x$. As $P_x$ increases, it is subtracted in the subtracting circuit 33 from $E_x$, causing the signal $D_x$ and consequently $D_n$ to decrease. This signal decreases to a very small quantity as $P_x$ becomes very nearly equal to $E_x$, but as amplifier 51 has very high gain, the very small signal applied to it is large enough to maintain the motor speed. Quantitatively, the amount of amplifier input signal becomes just enough to maintain such motor speed that the quantity $P_x$ is maintained only very slightly smaller than $E_x$. The difference between $P_x$ and $E_x$ can, in fact, be made negligible by making the amplifier gain high enough.

In this situation, since $E_x$ represents aircraft velocity in the $x$ direction, $P_x$ must also represent this velocity. Tracing back to the output conductor 63 at tachometer generator 58, it follows that the signal here, $V_N$ represents the aircraft velocity in the north-south direction.

Following the same reasoning, the signal $V_E$ at conductor 64 represents the aircraft east-west velocity and the signal $V_v$ in conductor 101 represents aircraft vertical velocity.

Strictly speaking, the coordinate transformation from $x$ $y$ $z$ coordinates to N, E, $v$ coordinates should require a more complex component than the planar coordinate transformer constituted by resolver 43. However, since the difference signals applied to it are compensated for pitch and roll errors, and because the vanishingly small signals $D_x$ and $D_y$ have somewhat the nature of servomechanism error signals, the single resolver produces results which are accurate.

The outputs of this circuit consist of the potentials $V_N$, $V_E$ and $V_v$ at conductors 63, 64 and 101, and the rates of shafts 56 and 57, also representing $V_N$ and $V_E$. The angular positions or deflections of shafts 56 and 57, as indicated by the counters 61 and 62, also constitute useful outputs representing distances travelled in the north-south and east-west directions respectively.

What is claimed is:

1. A navigation system computer comprising, an antenna rigidly fixed to the airframe of an aircraft and emitting a plurality of signal beams toward the earth's surface for reflection thereby, means responsive to echo signals reflected from the earth's surface for producing transverse, longitudinal and vertical velocity coordinate signals, a pitch resolver having its rotor positioned in accordance with the pitch of said aircraft and energized by signals representative of aircraft longitudinal velocity and aircraft vertical velocity, a roll resolver having its rotor positioned in accordance with the roll of said aircraft and energized by a signal representative of aircraft transverse velocity and one output derived from said pitch resolver, means for comparing said longitudinal coordinate velocity signal and another output of said pitch resolver for producing a first error signal, means comparing said transverse coordinate signal and one output of said roll resolver for producing a second error signal, first servo means energized by said first error signal for applying a pitch correction signal to the aircraft longitudinal velocity signal impressed on said pitch resolver, and second servo means energized by said second error signal for applying a pitch and roll correction signal to said aircraft transverse velocity signal impressed on said roll resolver.

2. A navigation system computer as set forth in claim 1 having means for comparing said vertical velocity coordinate signal with a second output of said roll resolver to provide a vertical velocity error correcting signal, and means for producing the signal representative of aircraft vertical velocity from said vertical velocity error correcting signal.

3. A navigation system computer comprising, an antenna rigidly fixed to the airframe of an aircraft and emitting a plurality of signal beams toward the earth's surface for reflection thereby, means responsive to echo signals reflected from the earth's surface for producing transverse, longitudinal and vertical velocity coordinate signals, means having said longitudinally velocity coordinate signal and a first servo loop output signal impressed thereon and producing a first error signal therefrom, means having said transverse velocity coordinate signal and a second servo loop output signal impressed thereon and producing a second error signal therefrom, means operated by said first and second error signals for producing signals representative of north-south and east-west aircraft velocity, means operated by the signals representing north-south and east-west aircraft velocity for producing signals representing aircraft longitudinal and transverse velocity, a pitch resolver having its rotor positioned in accordance with the pitch of said aircraft and producing said first servo loop output signal as one output thereof from a signal representative of aircraft vertical velocity and said signal representative of aircraft longitudinal velocity, a roll resolver having its rotor positioned in accordance with the roll of said aircraft and producing said second servo loop output signal from said signal representative of aircraft transverse velocity and the other output of said pitch resolver.

4. A navigation system computer as set forth in claim 3 having means for comparing said vertical velocity coordinate signal with a second output of said roll resolver to produce a vertical velocity error correcting signal, and means for converting said vertical velocity error correcting signal into said signal representative of aircraft vertical velocity.

5. A navigation system computer comprising, an antenna rigidly fixed to the airframe of an aircraft and emitting a plurality of signal beams toward the earth's surface for reflection thereby, means responsive to echo signals reflected from the earth's surface for producing transverse, longitudinal and vertical velocity coordinate signals, means having said longitudinal velocity coordinate signal and a first servo loop output signal impressed thereon and producing a first error signal therefrom, means having said transverse velocity coordinate signal and a second servo loop output signal impressed thereon and producing a second error signal therefrom, a first resolver having its motor positioned in accordance with aircraft heading and having said first and second error signals impressed thereon, means including rate servo means for producing a signal representative of aircraft north-south velocity from an output of said first resolver, means including second rate servo means for producing a signal representative of aircraft east-west velocity from another output of said first resolver, a second resolver having said signals representative of aircraft north-south and east-west velocity impressed thereon and producing therefrom signals representative of longitudinal and transverse aircraft velocity, a pitch resolver having its rotor positioned in accordance with the pitch of said aircraft and having said signal representative of longitudinal aircraft velocity and a signal representative of aircraft vertical velocity imposed thereon and producing said first servo loop output signal as one output thereof, a roll resolver having its rotor positioned in accordance with the roll of said aircraft and producing said second loop servo output signal from said signal representative of aircraft transverse velocity and the other output of said pitch resolver.

6. A navigation system computer as set forth in claim 5 having means for comparing said vertical velocity coordinate signal with a second output of said roll resolver to produce a vertical velocity error correcting signal, and means for converting said vertical velocity error signal into said signal representative of aircraft vertical velocity.

7. A computer for navigating an aircraft comprising, a fixed microwave antenna emitting several beams, means energizing said antenna, means receiving Doppler information from said antenna and emitting demodulated signals, frequency tracker means receiving said demodulated signals and emitting two signals representative of aircraft longitudinal and transverse velocity components, a subtracting circuit receiving one of said two signals, a pair of resolvers, heading reference means positioning said pair of resolvers in geographical coordinates, means connecting an output of one of said pair of resolvers through an amplifier, motor and first generator to an input of the other of the pair of resolvers, means connecting another output of said one of the pair of resolvers through another amplifier, motor and second generator to another input of said other of the pair of resolvers, means applying the difference terminal of said subtracting circuit to an input of said one of the pair of resolvers, a pitch resolver positioned to the pitch angle of said aircraft, a connection from an output of said other of the pair of resolvers to said pitch resolver, means connecting an output of said pitch resolver to said subtracting circuit, means securing an output signal representing the north-south component of aircraft velocity from said first generator, a second subtracting circuit receiving another of said two signals, means applying the difference signal of said second subtracting circuit to another input of said one of the pair of resolvers, a roll resolver positioned to the roll angle of said aircraft, a connection from another output of said other of the pair of resolvers to said roll resolver, means connecting an output of said roll resolver to said second subtracting circuit, and means securing an output signal representing the east-west component of aircraft velocity from said second generator.

8. A computer for navigating an aircraft comprising, a fixed microwave antenna emitting several beams, means energizing said antenna, means receiving Doppler information from said antenna and emitting demodulated signals, frequency tracker means receiving said demodulated signals and emitting three signals representative of aircraft velocity components in three mutually perpendicular directions, a subtracting circuit receiving one of said three signals, a pair of resolvers, heading reference means positioning said pair of resolvers relative to geographical coordinates, means connecting an output terminal of one of said pair of resolvers to an amplifier, motor and first generator in tandem, means connecting said first generator output to an input of the other of said pair of resolvers, means connecting the other output terminal of said one of the pair of resolvers to another amplifier, motor and second generator in tandem, means connecting said second generator output to the other input of said other of the pair of resolvers, means applying the difference terminal signal of said subtracting circuit to an input of said one of the pair of resolvers, a pitch resolver positioned to the pitch angle of said aircraft, a connection from an output of said other of the pair of resolvers to an input of said pitch resolver, means connecting an output of said pitch resolver to the subtrahend terminal of said subtracting circuit, a connection to said first generator output deriving a signal representative of the aircraft north-south velocity component, a second subtracting circuit receiving another of said three signals, means applying the difference terminal signal of said second subtracting circuit to the other input of said one of the pair of resolvers, a roll resolver positioned to the roll angle of said aircraft, a connection from the other output of said other of the pair of resolvers to an input of said roll resolver, a connection from the other output of said pitch resolver to the other input of said roll resolver, means connecting an output of said roll resolver to the subtrahend terminal of said second subtracting circuit, a connection to said second generator output deriving a signal representative of the aircraft east-west velocity component, a third subtracting circuit receiving still another of said three signals, a high gain amplifier, means applying the difference signal of said third subtracting circuit to said high gain amplifier, a connection from the output of said high gain amplifier, to the other input of said pitch resolver, said high gain amplifier output connection also constituting a third output terminal presenting a signal representing the aircraft vertical velocity component, and means connecting the other output of said roll resolver to the subtrahend terminal of said third subtracting circuit.

9. A computer for navigating an aircraft comprising, a fixed microwave antenna emitting several beams, means energizing said antenna, means receiving Doppler information from said antenna and emitting three demodulated Doppler spectra, frequency tracker means receiving said three demodulated Doppler spectra and emitting three signals respectively representative of aircraft velocity components in the longitudinal, transverse and vertical directions, first, second and third subtracting circuits each having minuend, subtrahend and difference terminals, said first subtracting circuit minuend terminal receiving said longitudinal velocity signal, first and second resolvers each having two input windings and two output windings, heading reference means positioning said first and second resolvers relative to a reference direction in the plane of the earth's surface, means connecting one of the windings of said first resolver to a first amplifier, first motor and first generator all in tandem, a connection from said first generator output to one of the input windings of said second resolver, said connection also constituting a system output terminal presenting a potential representing the north-south component of said aircraft velocity, means connecting the other output winding of said first resolver to a second amplifier, second motor and second generator all in tandem, means connecting said second generator output to the other input winding of said second resolver, said second generator connection also constituting a system output terminal presenting a potential representing the east-west component of said aircraft velocity, means applying the difference terminal signal of said first subtracting circuit to one input winding of said first resolver, a pitch resolver having two input windings and two output windings, means positioning said pitch resolver to said aircraft's pitch angle, a connection from an output winding of said second resolver to an input winding of said pitch resolver, means connecting an output winding of said pitch resolver to the subtrahend terminal of said first subtracting circuit, means applying said tranverse velocity signal to the minuend terminal of said second subtracting circuit, means applying the difference output of said second subtracting circuit to the other input winding of said first resolver, a roll resolver having two input windings and two output windings, means positioning said roll resolver to said aircraft's roll angle, a connection from the other output winding of said second resolver to an input winding of said roll resolver, a connection from the other output winding of said pitch resolver to the other input winding of said roll resolver, means connecting an output of said roll resolver to the subtrahend terminal of said second difference circuit, means applying said vertical velocity signal to the minuend terminal of said third subtracting circuit, means applying the difference output of said third subtracting circuit to the input of a third amplifier, a connection from the output of said third amplifier to the other input winding of said pitch resolver, said third amplifier output also constituting a system output presenting a potential representing the vertical component of said aircraft velocity, and means connecting the second output winding of said roll resolver to the subtrahend terminal of said third subtracting circuit.

References Cited in the file of this patent
UNITED STATES PATENTS
2,795,782    Hooper _____ June 11, 1957